(12) United States Patent
Glover

(10) Patent No.: US 10,751,234 B2
(45) Date of Patent: Aug. 25, 2020

(54) CART ADAPTED FOR CONNECTION TO A WHEELCHAIR

(71) Applicant: Darius Glover, Riverdale, GA (US)

(72) Inventor: Darius Glover, Riverdale, GA (US)

( * ) Notice: Subject to any disclaimer, the term of this patent is extended or adjusted under 35 U.S.C. 154(b) by 82 days.

(21) Appl. No.: 15/870,434

(22) Filed: Jan. 12, 2018

(65) Prior Publication Data

US 2018/0193211 A1 Jul. 12, 2018

Related U.S. Application Data

(60) Provisional application No. 62/445,581, filed on Jan. 12, 2017.

(51) Int. Cl.
*A61G 5/02* (2006.01)
*A61G 5/10* (2006.01)
*B62B 5/00* (2006.01)
*B62B 3/00* (2006.01)

(52) U.S. Cl.
CPC ............ *A61G 5/1094* (2016.11); *B62B 5/002* (2013.01); *A61G 2203/80* (2013.01); *B62B 3/00* (2013.01); *B62B 2207/02* (2013.01)

(58) Field of Classification Search
CPC ... A61G 5/1094; A61G 2203/80; B62B 5/002
See application file for complete search history.

(56) References Cited

U.S. PATENT DOCUMENTS

| | | | | |
|---|---|---|---|---|
| 4,305,601 A | * | 12/1981 | Berge | A61G 5/10 280/304.1 |
| 4,611,819 A | * | 9/1986 | Glasford | A61G 5/10 280/304.1 |
| 4,778,037 A | * | 10/1988 | Papadopoulos | F16F 3/04 188/378 |
| 5,957,477 A | * | 9/1999 | Ensz | B60D 1/155 280/482 |
| 6,702,313 B2 | * | 3/2004 | Forshee | A61G 5/10 280/304.1 |
| 7,782,194 B2 | * | 8/2010 | Stawar | B62B 3/1408 224/411 |
| 8,308,406 B2 | * | 11/2012 | Parks | A61G 5/10 410/4 |
| 8,870,209 B2 | * | 10/2014 | Conrad | B60D 1/167 280/250.1 |
| 9,308,790 B1 | * | 4/2016 | Sharp | B60D 1/167 |
| D770,716 S | * | 11/2016 | Giampavolo | D34/17 |
| 2011/0121541 A1 | * | 5/2011 | Yamano | B60D 1/00 280/515 |

\* cited by examiner

*Primary Examiner* — Jacob D Knutson
*Assistant Examiner* — Marlon A Arce
(74) *Attorney, Agent, or Firm* — Dentons US LLP

(57) ABSTRACT

A cart for connecting or attaching to a wheelchair is provided to assist a wheelchair user to more easily collect and move items, such as groceries. In certain embodiments the cart is further defined as a shopping cart.

17 Claims, 15 Drawing Sheets

CART ADAPTED FOR CONNECTION TO A WHEELCHAIR

CROSS-REFERENCE TO RELATED APPLICATIONS

This Application is claims benefit of U.S. Provisional Application Ser. No. 62/445,581, filed Jan. 12, 2017, entitled CART ADAPTED FOR CONNECTION TO A WHEELCHAIR, the contents of which are hereby incorporated by reference in their entirety.

FIELD OF THE INVENTION

The principles of the present invention relate generally to a cart adapted to connect to, or in some embodiments engage with, a wheelchair to facilitate shopping by a user in the wheelchair.

BACKGROUND OF THE INVENTION

Currently, handicapped shoppers are provided with few options when it comes to shopping in most stores: ask an employee to help them out of their personal wheelchair into a generic store owned wheelchair that has a small basket welded on; place a small unstable plastic hand basket on their lap; or have assistance from an employee pushing around a cart, accompanying the individual while they shop. Whenever the handicapped shopper needs an item that is out of their reach, the shopper either need to apply excessive strain and creativity to get the item or ask someone for help. Grocery stores have hundreds of handicapped customers who lack the freedom of shopping independently. Therefore, the need for a product that will ease such tasks for handicapped shoppers.

BRIEF SUMMARY OF THE INVENTION

One embodiment of a cart that allows individuals in wheelchairs to shop comfortably and independently, the cart being securely attached to the user's wheelchair. The cart of the present disclosure is adaptable to most wheelchairs that are currently on the market today. The cart of the present disclosure is configured to maneuver through a store and around other people in a fluid manner as a result of a secured connection mechanism and, optionally, a wheel base of the cart. The cart of the present disclosure may also be configured so as to fit over the user's lap, which reduces the need for the user to reach far to place items in the cart.

Another embodiment of a cart that is releasably attachable with a wheelchair may include a frame and a basket connected to the frame. Multiple wheels may be configured to support the frame. A pair of wheelchair connector arms may be connected to the frame, and include a bracket connected to the frame, a guidepost extending from the bracket, a compression spring coaxially disposed on the guidepost, and an arm having a first end and a second end. The first end of the arm may be slidably supported by the guidepost. The compression spring may be configured to apply a force to the bracket and the arm. The arm may be releasably attachable with the wheelchair.

Another embodiment may include a cart adapted for connection with a wheelchair, the cart including a frame including a lower frame portion and an upper frame portion. At least one leg may be connected between vertical elements attached to the base. A basket may be connected to the upper frame portion. Multiple wheels may be attached to the lower frame portion base. A pair of wheelchair connector arms may be connected to the frame. The connector arms may include a bracket connected to the frame, and a guidepost extending from the bracket, a compression spring coaxially disposed on the guidepost. An arm may have a first end and a second end, the first end of the arm may be slidably supported by the guidepost. The compression spring may be configured to apply a force to the bracket and the arm. A retention member may be attached to the second end of the arm, and be oriented to face the other arm positioned on the cart.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

The presently described cart allows handicapped customers to maneuver the cart and move through the store with ease. The current cart options provided in stores are very inconvenient for the handicapped customer. The presently described cart allows multiple types of wheelchairs to securely attach to the cart while keeping the mechanisms simple and safe for the user.

Figure 1A:
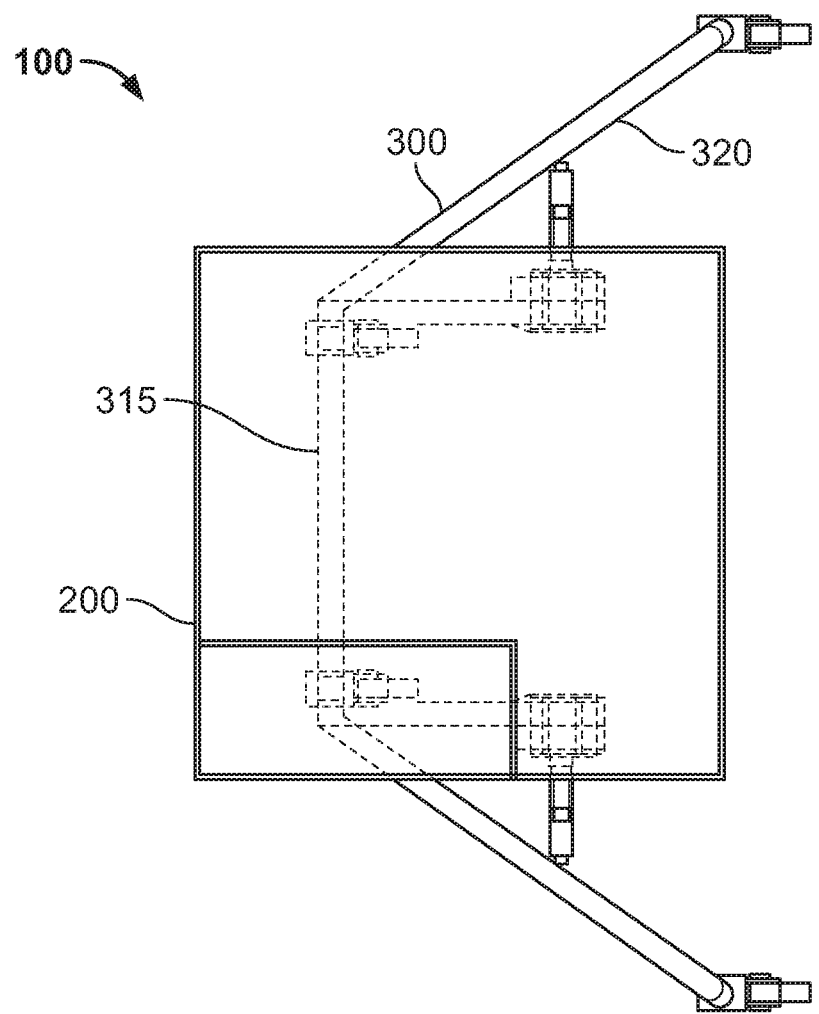
FIGS. 1A-1D are illustrations of different views of an illustrative embodiment of a cart configured to be releasably attached to a wheelchair.

With regard to FIG. 1A, an illustration of a top view of an illustrative cart is shown. The cart 100 may include a basket 200 along with a frame 300, including an upper frame 315 and a lower frame 320. Multiple legs 330 may extend from the basket 200 to the lower frame 320. The lower frame 320 may include at least one member that supports the legs and basket. More specifically, the lower frame may include (i) a front lower frame member 322 and (ii) a pair of side lower frame members 324 that angularly extend from the front lower frame member. The angle of the side free members 324 may be between about 30° and 45° relative to the forward lower frame member 322. As further shown, attached to the lower frame 320 are two pairs of wheels, including (i) a pair of forward wheels 400 and (ii) a pair of rear wheels 420. The forward wheels 400 may be disposed beneath the basket 200, and the pair of rear wheels 420 may be disposed at respective ends of the side lower frame members 324. In addition, an upper frame 315 may connect to the legs 330 and support the basket 200.

Although the lower frame 320 is shown to include three members that are connected (e.g., welded) to one another, it should be understood that alternative numbers of members (e.g., 1 or more members) may be utilized. Moreover, although four caster wheels 400, 420 are shown, alternative number and types may be utilized. For example, rather than using cylindrical wheels, spherical ball casters may be utilized, thereby providing for more easily rotatable wheels in an axial direction so as to provide for less resistance and better retention of the cart 100 to the wheelchair (i.e., less force is applied as a moment arm at a plane of the wheels of the cart). The wheels may be configured to swivel to allow the cart to rotate 360-degrees.

Supported by the upper frame portion 315 may be a pair of wheelchair connector arms 500 that, while not in operation, may hang from the upper frame portion 315. The wheelchair connector arms 500 may be rotatable to enable a user to rotate the connector arms 500 for removably attaching to a portion of the wheelchair (e.g., armrest bars or other structural member(s) of the wheelchair).

Figure 1B:
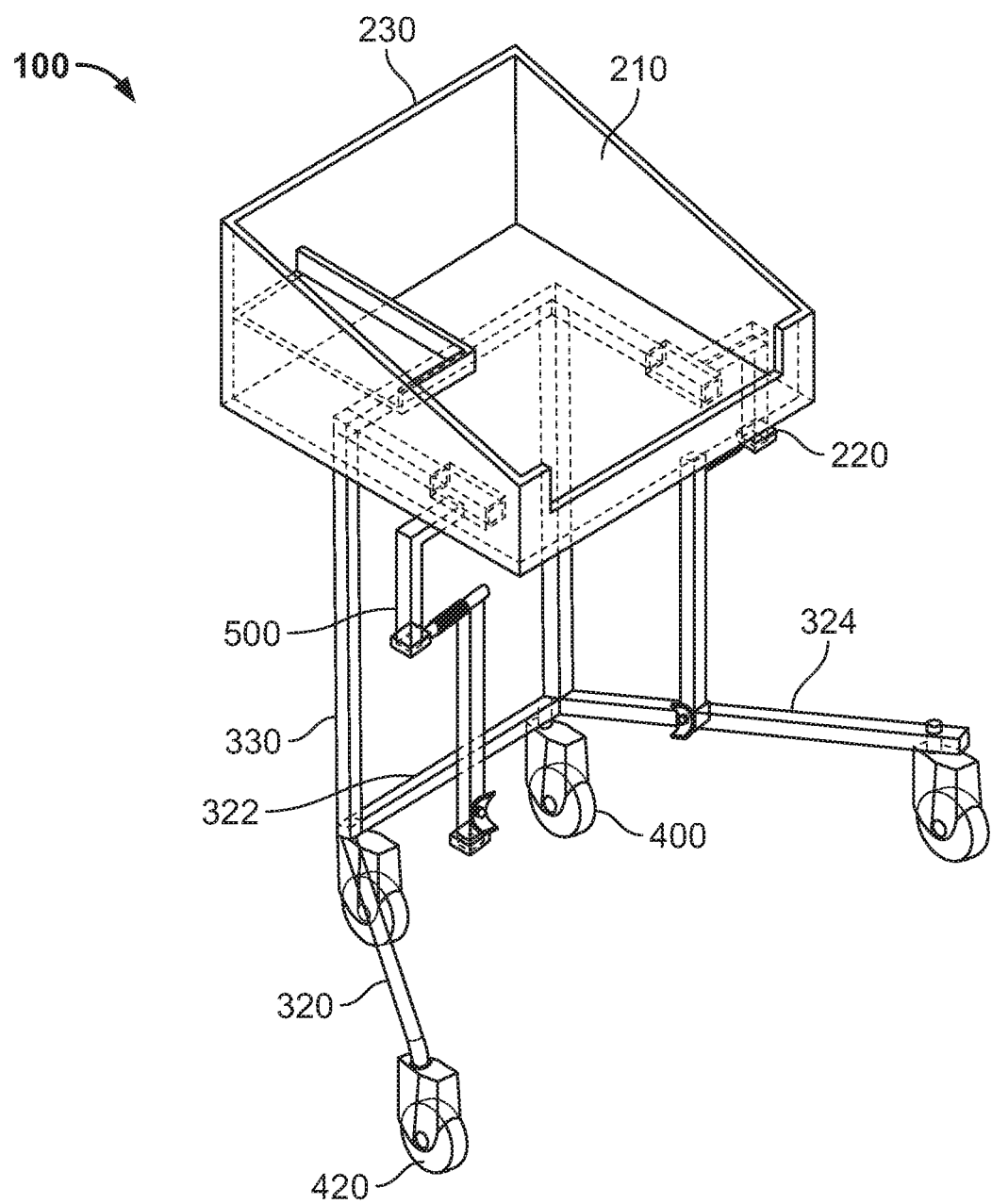

FIG. 1B is an illustration of a top front left perspective view of the cart 100 of FIG. 1A. The basket 200 has a basket front wall 220 that is low and faces a user of the basket, thereby making it easy for the user who is in a wheelchair to place products into and remove products from the basket 200. The basket sidewalls 210 are shown to have a ramped height to a back wall 230 that has a height that is tall enough to prevent taller items to be prevented from falling out. It should be understood that the sidewalls 210 may be at a constant height, but by using a sloped height, a user is more easily able to place items into the basket over the sidewalls 210 as opposed to having to place the items in the basket from the front each time. According to an embodiment of the invention, the height of the front most portion of the sidewalls 210 is approximately one-half the back most portion of the sidewalls 210. For example, the sidewalls 210 may be sloped from a front most height of 6 inches to a back most height of 12.25 inches.

Figure 1C:
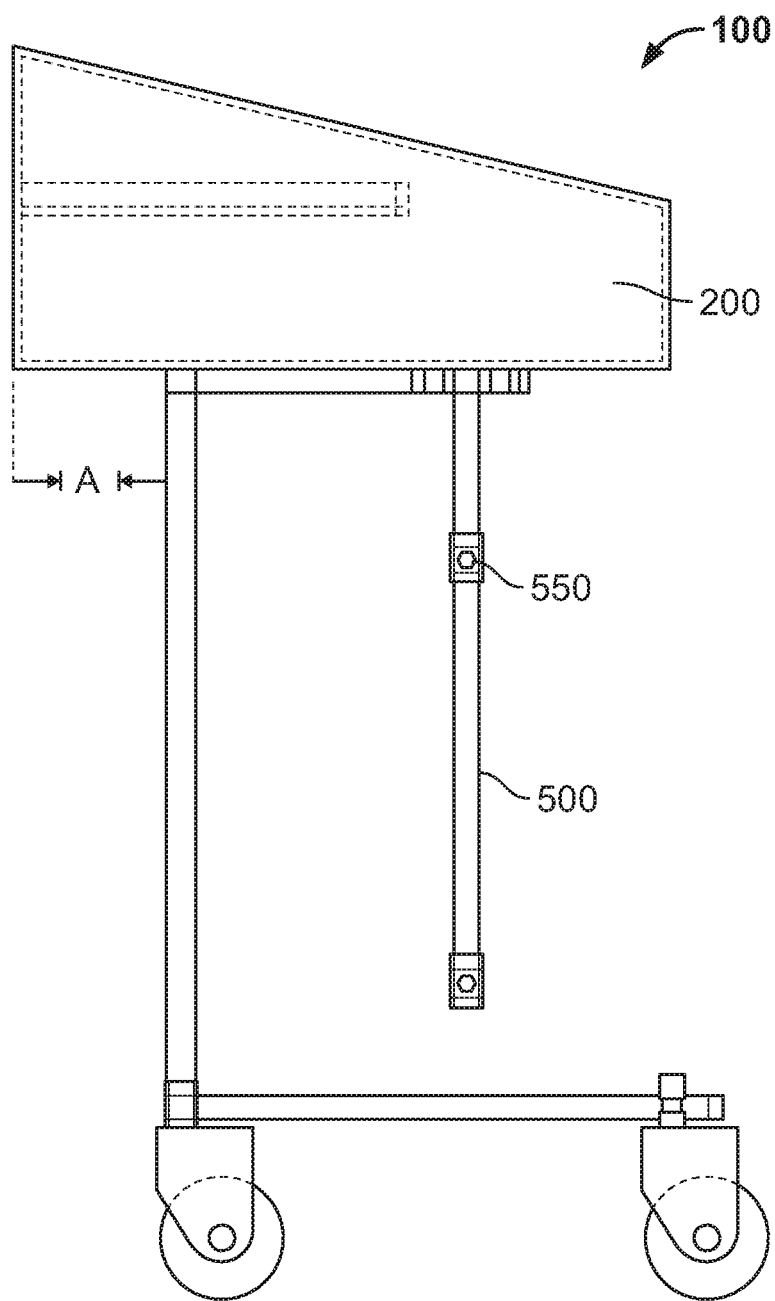

FIG. 1C shows a side view of the cart of FIG. 1A. As shown, the wheelchair connector arms 500 may extend downward and include a hinge member 550 about a quarter of the way down along the wheelchair connector arms. In an embodiment, height of the connector arms 500 may be adjusted so that the connector arms 500 are able to properly engage a wheelchair of different types and heights. In an embodiment, for optimal stability and reduced overall footprint of the wheelchair-cart combination, the basket 200 may be disposed so that the distance A between the back wall and the vertically extending legs 330 is approximately 20 to approximately 25 percent of the overall length of the basket 200. For example, according to an embodiment of the invention, the basket is sized 24×24 inches and the distance A shown in FIG. 1C is 5.5 inches.

Figure 1D:
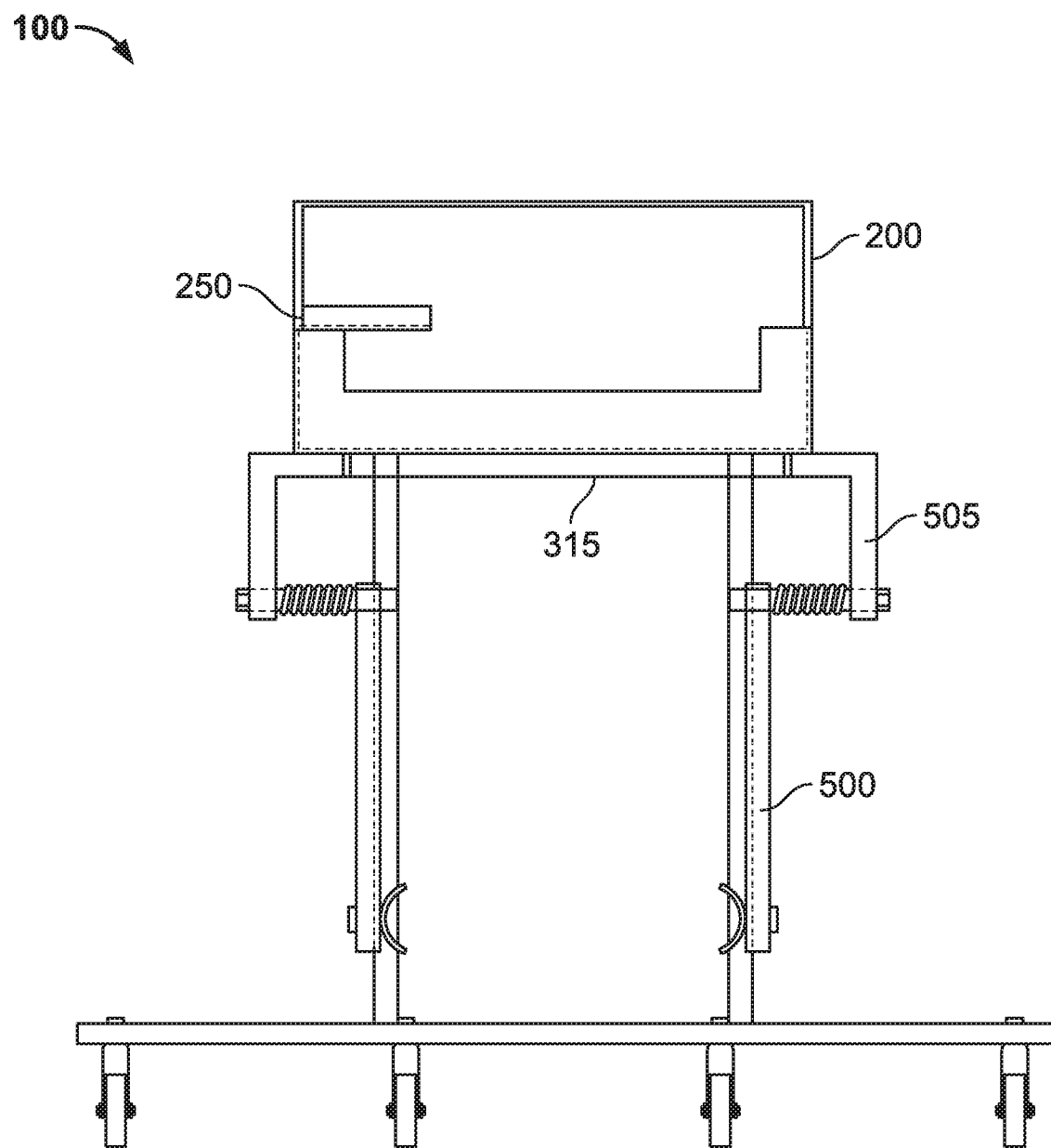

FIG. 1D shows a front view of the cart of FIG. 1A. As shown, the wheels 400, 420 have approximately equal spacing. It should be understood that the spacing may not be substantially equal. The wheelchair connector arms 500 are also shown to have a bracket member 505 that connects to the upper frame members 315 and that extend laterally beneath and outward from the basket 200. The spacing, at least in part, enables the cart to properly align the connector arms 500 to engage structures of the wheel chair, such as arm or leg members of a wheelchair. The brackets 505 may be fixed length or be adjustable as to enable different width wheelchairs to be more easily used. In an embodiment, the brackets 505 may be rotatably configured to enable the brackets 505 to be moved underneath the basket 200 for storage purposes.

The cart 100 is configured so that when the wheelchair and cart 100 are connected together, the combination wheelchair-cart has a minimal turning radius. In certain embodiments, the turning radius is between about three to about four feet with the ability to rotate in place, making it easy for the user to maneuver the cart 100 around a store. The cart is configured so as to have minimal weight. For example, the maximum cart weight is under about 50 pounds. Additionally, the maximum volume of the cart 100 is between about 5,000 to about 6,000 cubic inches, and the carrying capacity is over about 200 pounds. These dimensions and values allow the basket 200 to be large enough for the user to have enough space to hold a sufficient amount of items without the cart 100 being too large given that the cart 100, when in use, is rigidly attached to a wheelchair of the user. In some embodiments, the basket 200 includes at least one shelf 250 to hold items. The shelf 250 may be large enough to hold a carton of eggs and/or other small and/or delicate items. The shelf 250 may include a shelf bottom surface 252, a shelf front wall 254, and a shelf sidewall 256 (shown in FIG. 6B). Other support members may be provided within or outside of the basket 200 (e.g., beneath the basket). In operation, the cart 100 is configured through use of the wheelchair connector arms 500 to maintain a secure connection during the entirety of the shopping trip, thereby maintaining safety of the user and providing ease of use.

Figure 2A:
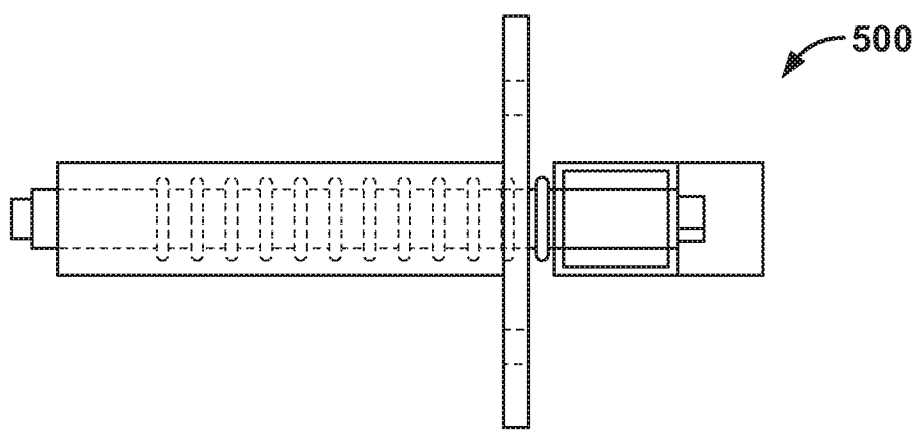
FIGS. 2A-2D are illustrations of different views of an embodiment of a connector element for use in releasably attaching the cart of FIGS. 1A-1D and wheelchair.
Figure 2B:
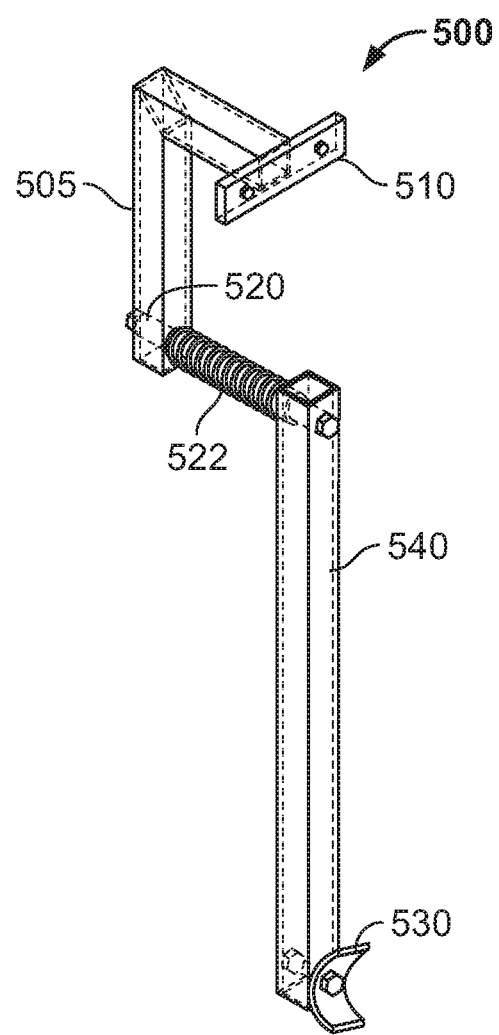

FIGS. 2A-2D are illustrative drawings of a wheelchair connector arm 500 according to an embodiment of the invention. FIG. 2A is a top view illustration of the wheelchair connector arm 500, which shows that the arm is substantially planar when not in use (i.e., hanging from the upper frame). FIG. 2B is a top front left perspective view of the wheelchair connector arm 500, which shows that there is a bracket member 505 having a 90-degree bend at an elbow and a connector bar 510 that is configured to attach to the upper frame 315 (see FIG. 2D). It should be understood that alternative bracket and members or methods for attachment may be utilized.

As shown, at the bottom of a vertical bracket member 505, a connector rod 520 may connect to the bracket member 505 and an arm 540 on which a retention member 530 or other attachment member may be positioned. The retention member 530 may have a semicircular shape to at least partially encircle a tube member of a wheelchair. The connector rod 520 in this embodiment includes one or more springs 522 that enables the arm 540 to slide outward and inward along the connector rod 520, as further described with regard to FIG. 5, but is not limited thereto. The spring(s) 522 may provide enough outward force or deflection load (i.e., the amount of force generated by a spring at a specific distance traveled) to allow the user to align the retention member on a portion of the wheelchair (e.g., vertical bar of the wheelchair) and to cause the retention member 530 to be engaged in a forceful enough manner to maintain a rigid connection (i.e., not easily bent) or semi-rigid or sturdy connection (e.g., bent with some minimum level of force that is reasonable for someone to apply), but that enables a user to disengage the wheelchair arms 500) from the wheelchair when complete. In an embodiment, the force of the spring(s) 522 may provide for pressure between 20 and 50 PSI. In an embodiment, the deflection load may be between about 5 pounds and about 50 pounds. Other higher or lower forces may alternatively be utilized. The arm 540 is able to rotate around the connector rod 520, thereby providing for adjustable heights of the retention member 530 to engage the wheelchair. Although a spring may be utilized, it should be understood that alternative configurations that do not use a spring may be utilized, as well, to provide for the same or similar functionality. For example, slide mechanisms that allow slidable engagement of the connector rod 520 with the wheelchair arms 500 may be utilized.

Figure 2C:
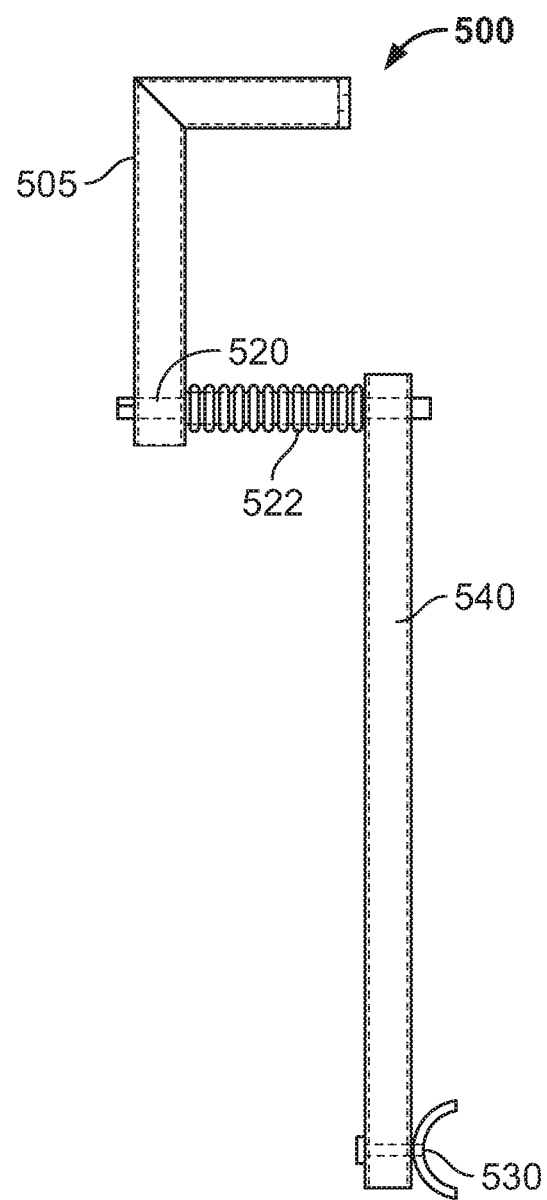
Figure 2D:
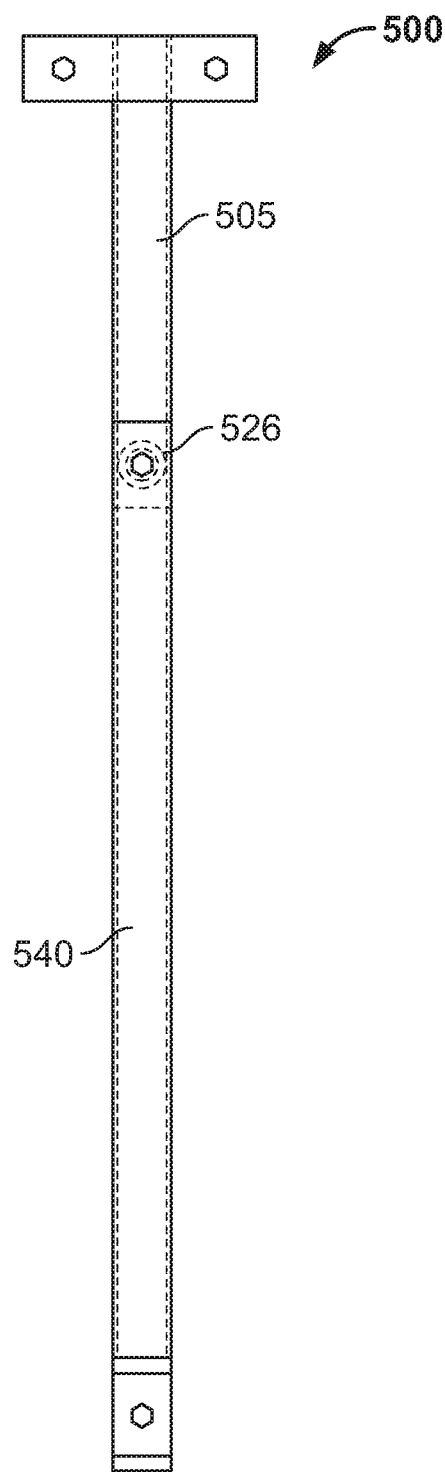

FIG. 2C is a side view of the wheelchair connector arm 500 that shows how the bracket member 550, connector rod 520, and arm 540 are aligned, and how the arm 540 is able to rotate, which allows for a user to easily raise the retention member 530 to a position to attach to an arm bar or other member of a wheelchair. FIG. 2D is a front view of the wheelchair connector arm 500, which shows bolt or screw holes 526 defined by the connector bar.

Figure 3A:
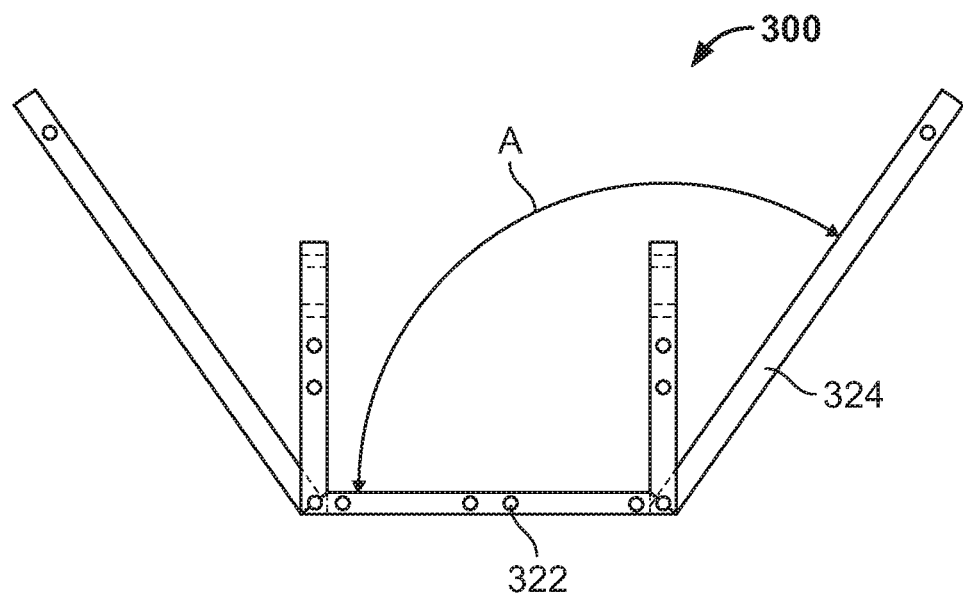
FIGS. 3A-3D are illustrations of different views of an embodiment of a frame of the cart.

FIG. 3A shows a top view of an illustrative frame of the cart of FIG. 1A. The side frame member 324 forms an angle A with respect to front frame member 322. In this embodiment of the invention, the angle A at which a side frame member 324 extends is 125 degrees from a front frame member 322. It should be understood that alternative angles may be utilized. In an alternative embodiment, the angle between the front frame member 322 and side frame members 324 may be adjustable by the user. In the embodiment shown, the side frame members 324 may be 24 inches, and a width between end points of the side frame members 324 may be about 44 inches. It should be understood that the invention is not limited to these dimensions; however, the dimensions should be established so that the side frame members 324 avoid interference of a user's wheelchair and arms for operating the wheelchair. In addition, the dimensions should be configured to provide for proper turning radius given that the cart 100 will extend from a front of a wheelchair and, thus, operate to lengthen a wheelbase of a combined wheelchair and cart 100.

Figure 3B:
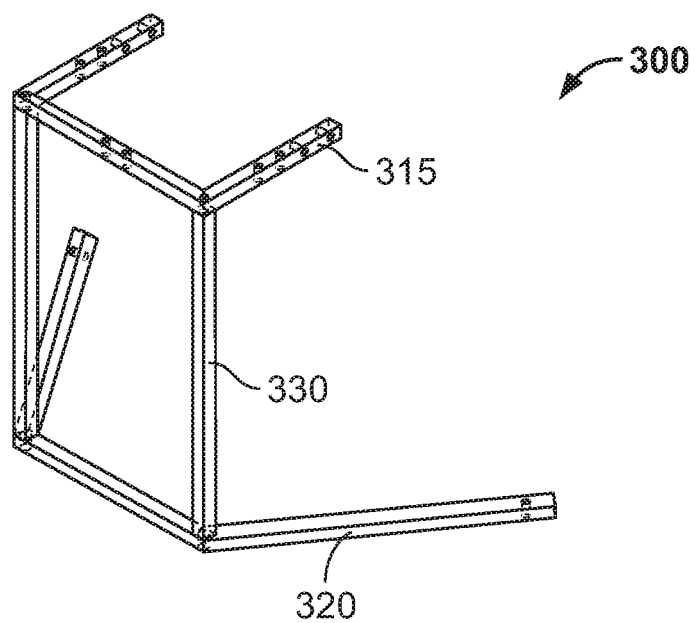
Figure 3C:
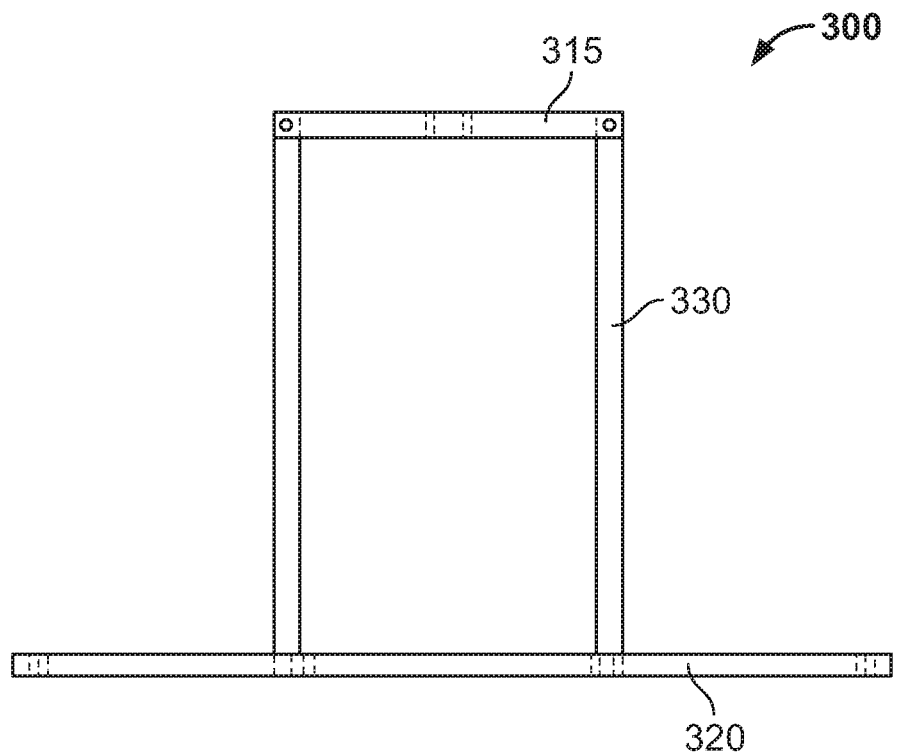
Figure 3D:
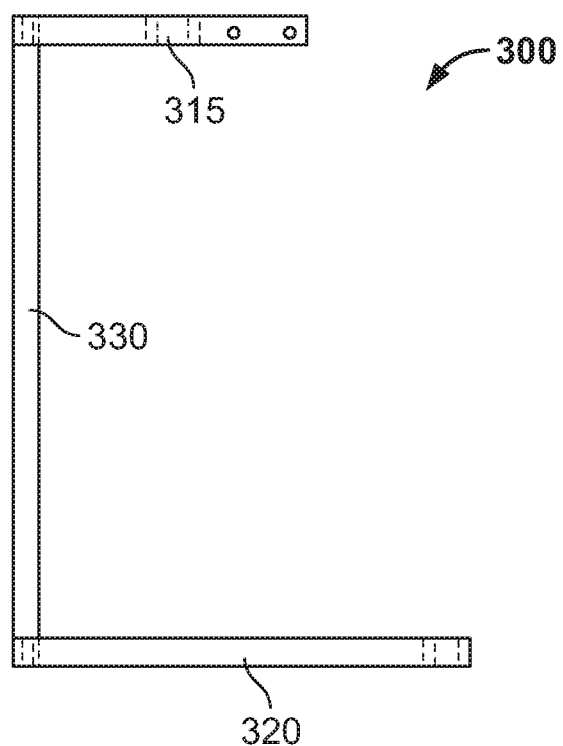

FIG. 3B shows a top front right perspective view of the frame of FIG. 3A. The connections of each of the members may be formed by welding, connector members (e.g., nuts and bolts), adhesives, or combination thereof. FIG. 3C shows a front view of the frame of FIG. 3A. FIG. 3D shows a side view of the frame of FIG. 3A.

Figure 4:
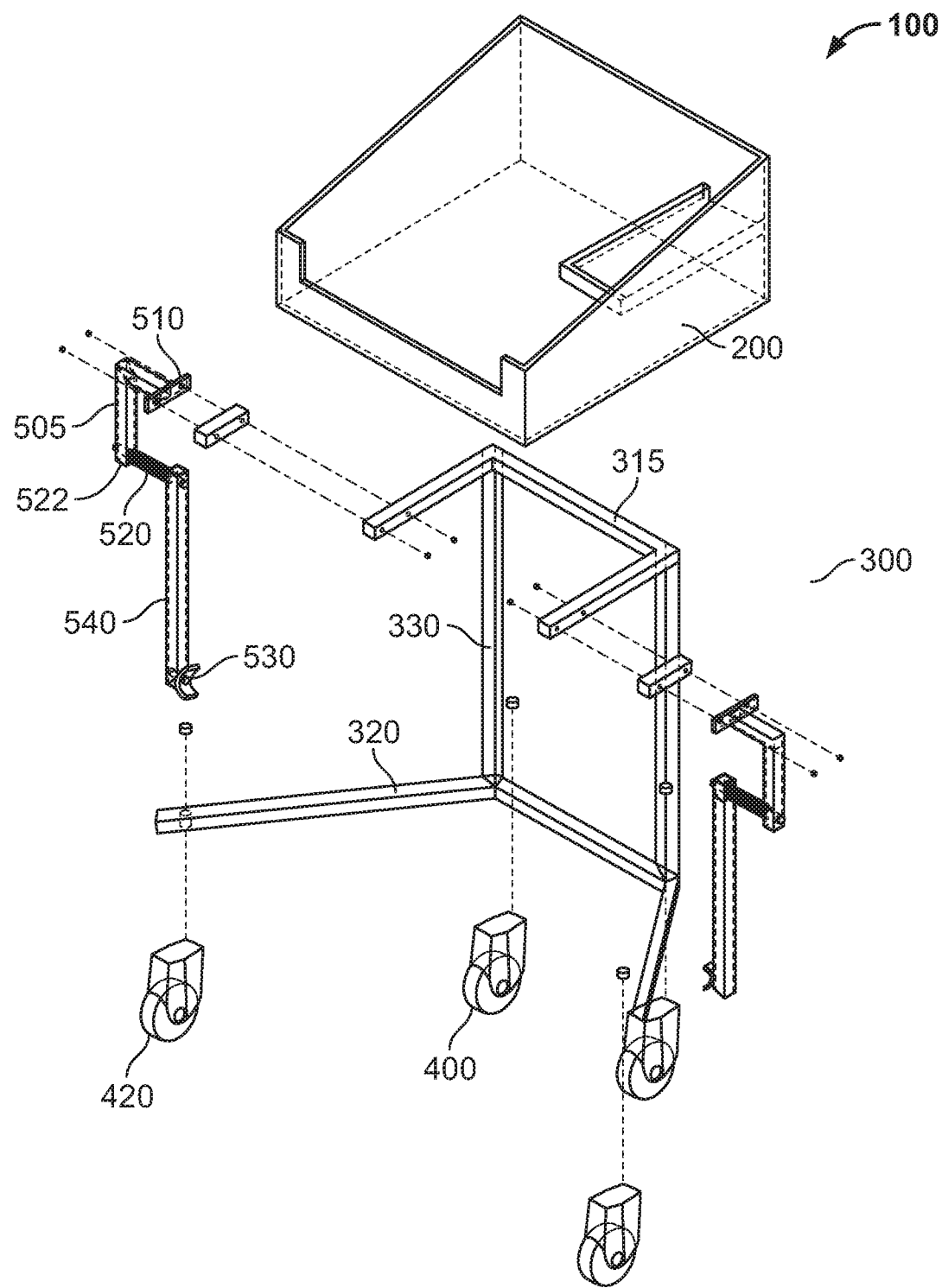
FIG. 4 is an exploded right rear perspective view of the embodiment of the cart shown in FIGS. 1A-1D showing connection of the various elements of the cart.

FIG. 4 is an exploded right rear perspective view of the embodiment of the cart 100 shown in FIG. 1 showing connection of the various elements of this embodiment of the cart.

Figure 5:
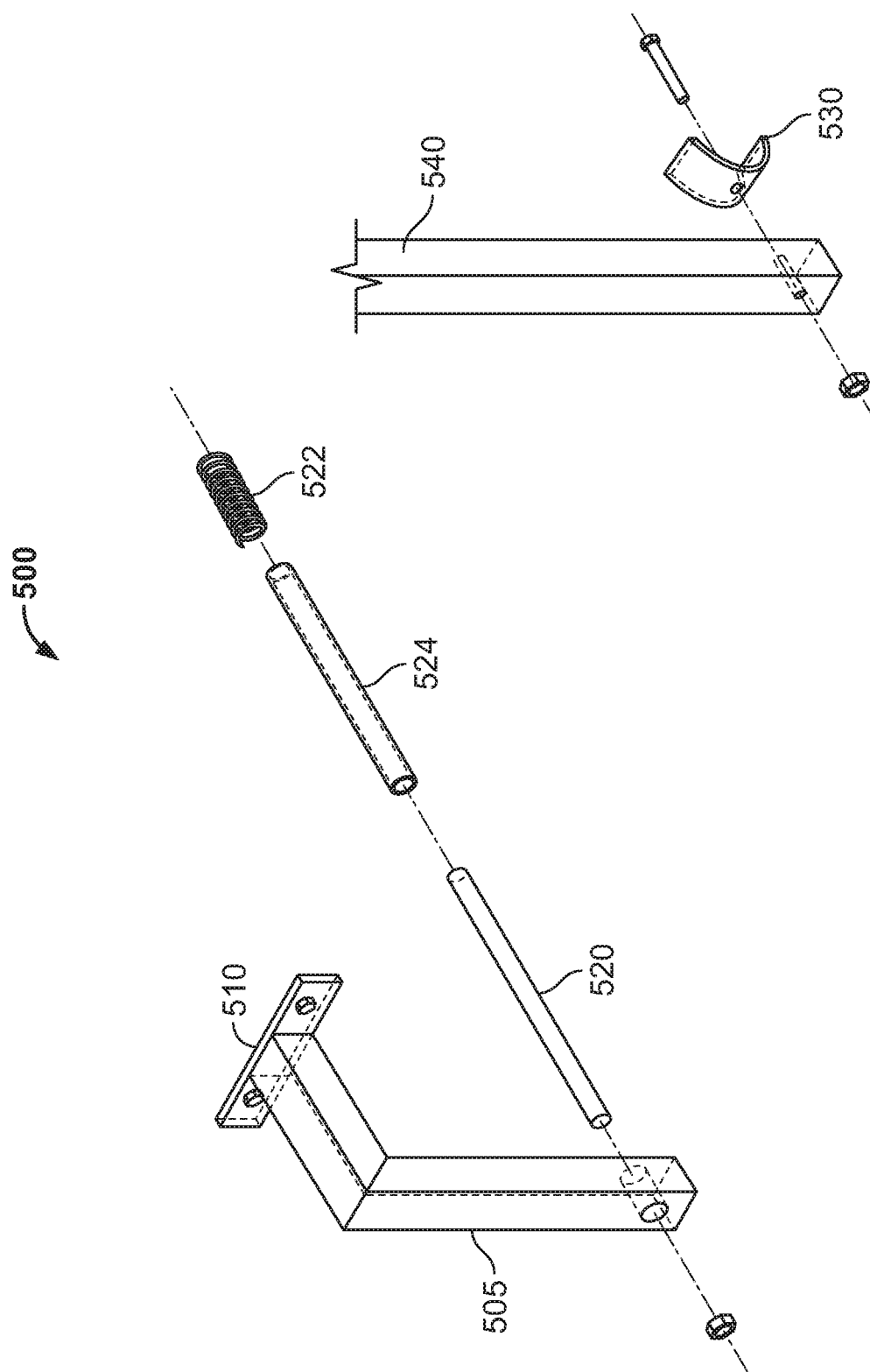
FIG. 5 is an exploded left front perspective view of the connector element shown in FIG. 2, showing connection of the various elements of this embodiment of the connector element.

FIG. 5 is an exploded left front perspective view of the embodiment of the connector arm 500 shown in FIG. 2, which includes various elements that provide for support, movement, and retention force when in operation. As shown, a rod or guidepost 520 may be covered by a sleeve 524, which may be covered by a spring 522. The spring 522 may be a compression spring, and provide for a certain amount of force against the arm, thereby enabling a user to slide the arm 540 outward, align the retention member 530 with a member of a wheelchair, and release the arm 540 so that the retention member 530 presses against the member of the wheelchair to be securely engaged thereto. The force or tension of the two springs 522 are to retain the cart 100 to the wheelchair, such that when a user turns the wheelchair, the cart 100 follows.

Figure 6A:
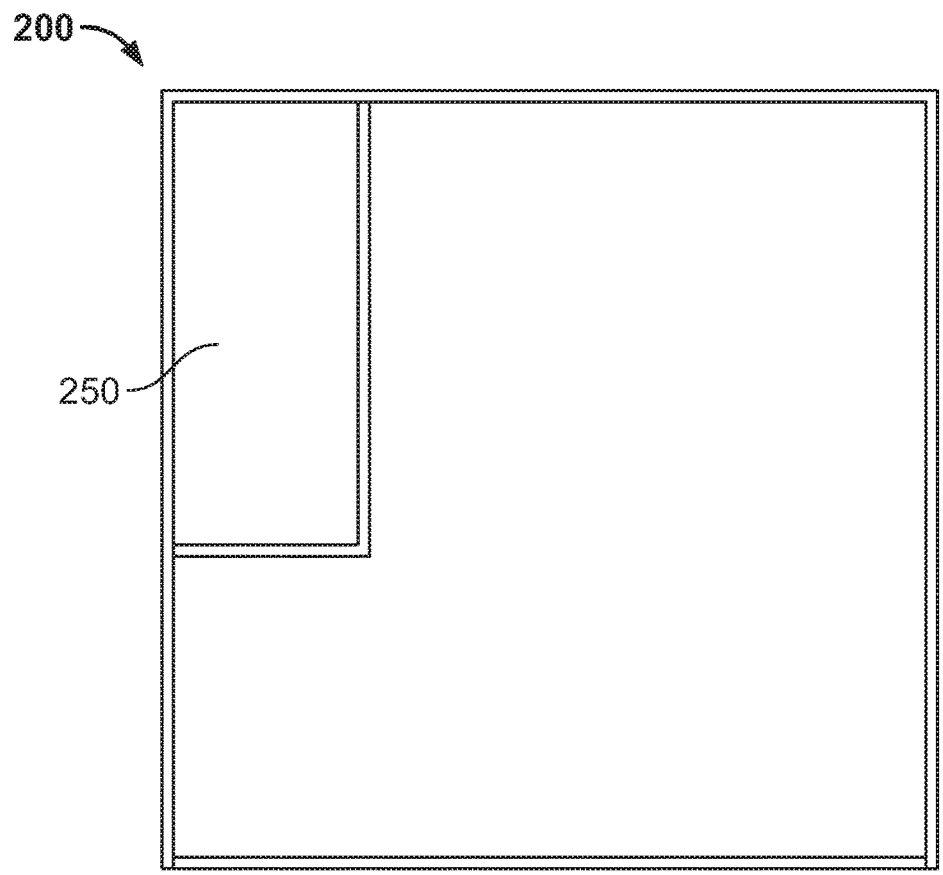
FIGS. 6A-6D are illustrations of different views of an embodiment of a basket of the cart.
Figure 6B:
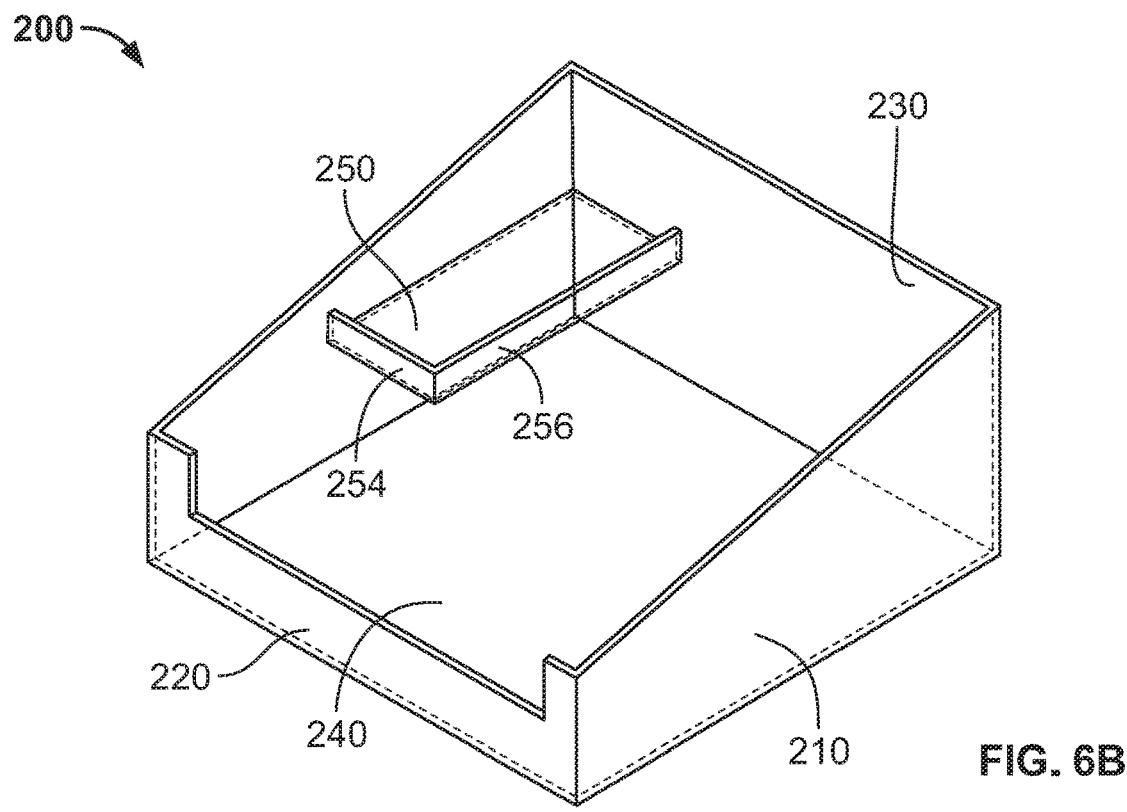

FIG. 6A shows a top view of the basket 200 of FIG. 1A. According to an embodiment of the invention, dimensions of the basket may be 24"×24"; however, it should be understood that other dimensions may be utilized. In addition, the basket 200 may include a shelf 250, such as 6"×14" may be sized for a carton of eggs or other fragile foods or items. The shelf 250 may include sidewalls having a height that is tall enough to prevent taller items to be prevented from falling out. For example, the shelf 250 may be arranged at a corner of the basket 200, such that the sidewalls include a shelf front wall 254, a shelf sidewall 256, one of the basket sidewalls 210, and the basket back wall 230. According to an embodiment of the invention, the height of the shelf front wall 254 and the shelf sidewall 256 is one inch, and the shelf bottom surface 252 is located above and spaced apart from a bottom surface 240 of the basket 200. It should be understood that the shelf 250 may be larger or smaller, and optionally have other dimensional configurations. Additionally, the basket front wall 220 may have a cutout portion C to facilitate placement of items into the basket by the user, such as shown in FIG. 6B. According to an embodiment of the invention, the cutout portion C may measure 3 inches by 19.5 inches, but is not limited thereto. As previously described, other support members may be provided to support small or large items.

Figure 6C:
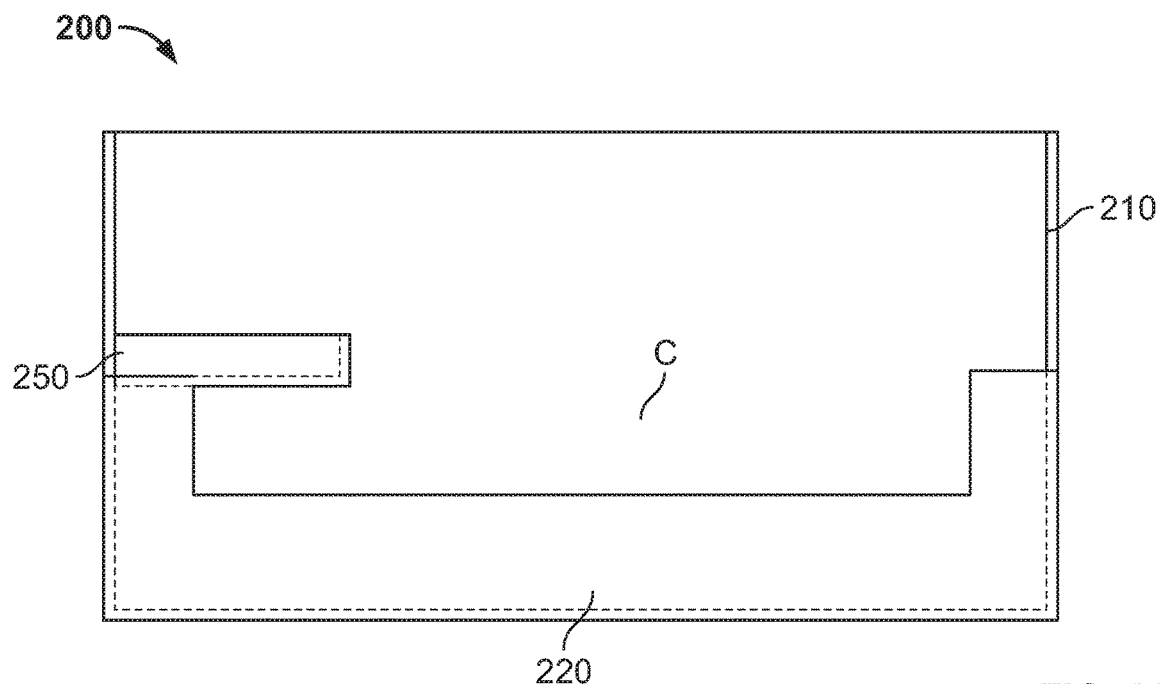
Figure 6D:
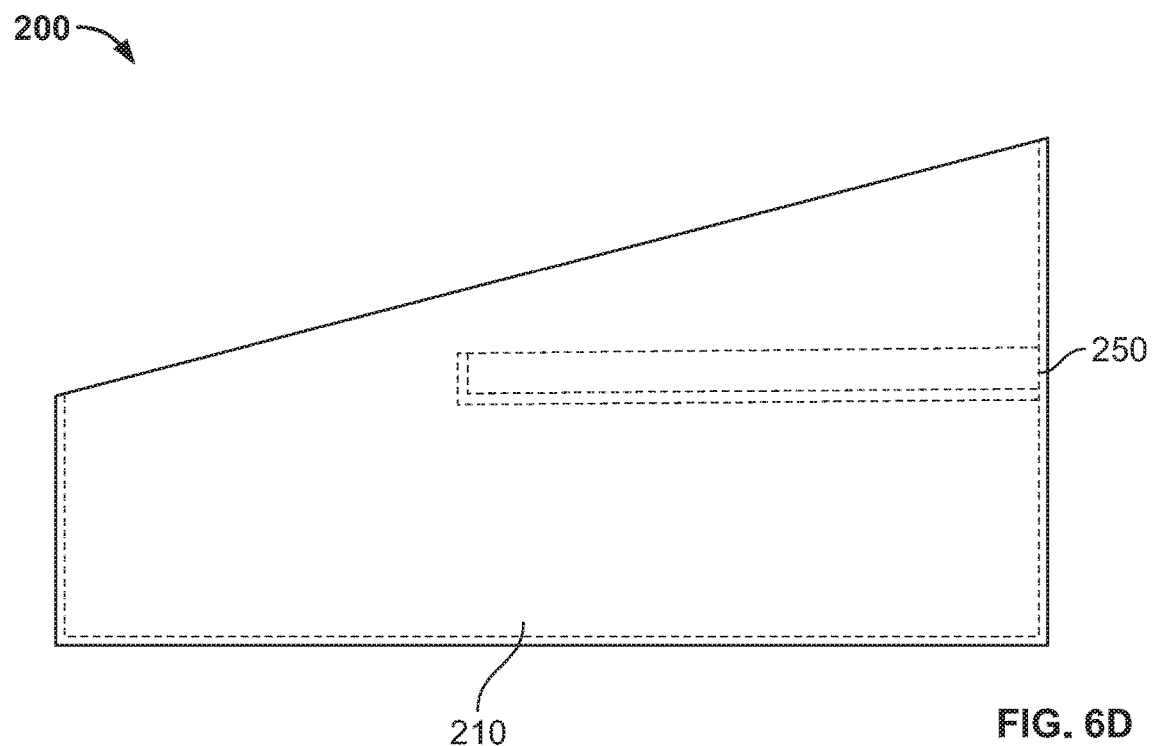

FIG. 6B shows a top rear right perspective view of the basket 200 of FIG. 6A. FIG. 6C shows a front view of the basket 200 of FIG. 6A. FIG. 6D shows a side view of the basket of FIG. 6A.

Figure 7A:
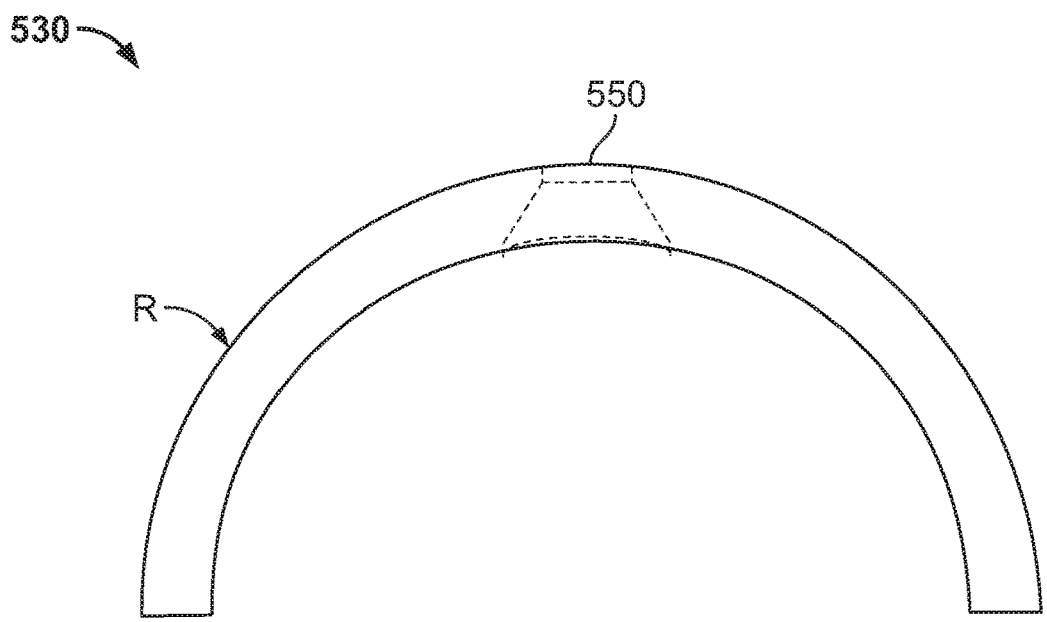
FIGS. 7A-7D are illustrations of different views of one embodiment of a connector member, in this case a semi-circular member.

FIG. 7A shows a top view of a retention member 530 of FIG. 1A. The retention member 530 may be made of a nylon, metal, plastic, or any other material that is sufficiently rigid so as to not bend when a force to move the cart 100 is applied thereto. The retention member 530 may, however, be flexible enough to latch or attach onto a bar of a wheelchair, in an embodiment. According to an embodiment of the invention, the retention member 530 may have a half-circle shape and a radius R of 0.95 inches. Alternative shapes and dimensions may be utilized. The retention member 530 may define an opening 550 through which a screw or bolt may extend to connect to the arm for retaining the retention member 530. As shown, for example 550, the opening may be centrally disposed and have a radius of 0.190 inches to receive a screw or a bolt.

Figure 7B:
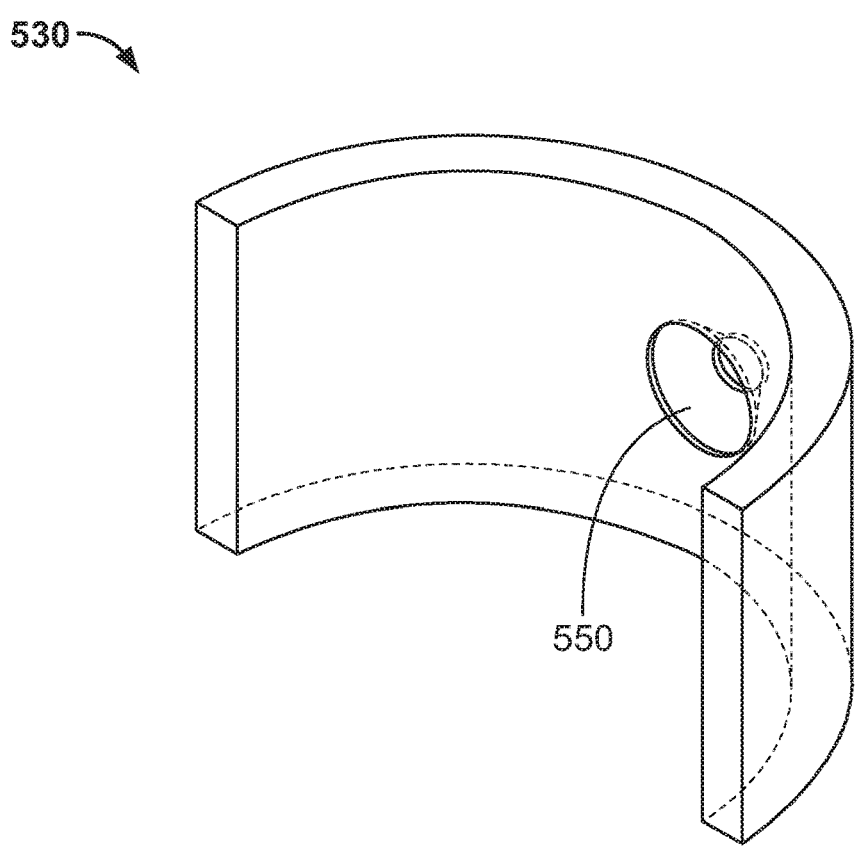
Figure 7C:
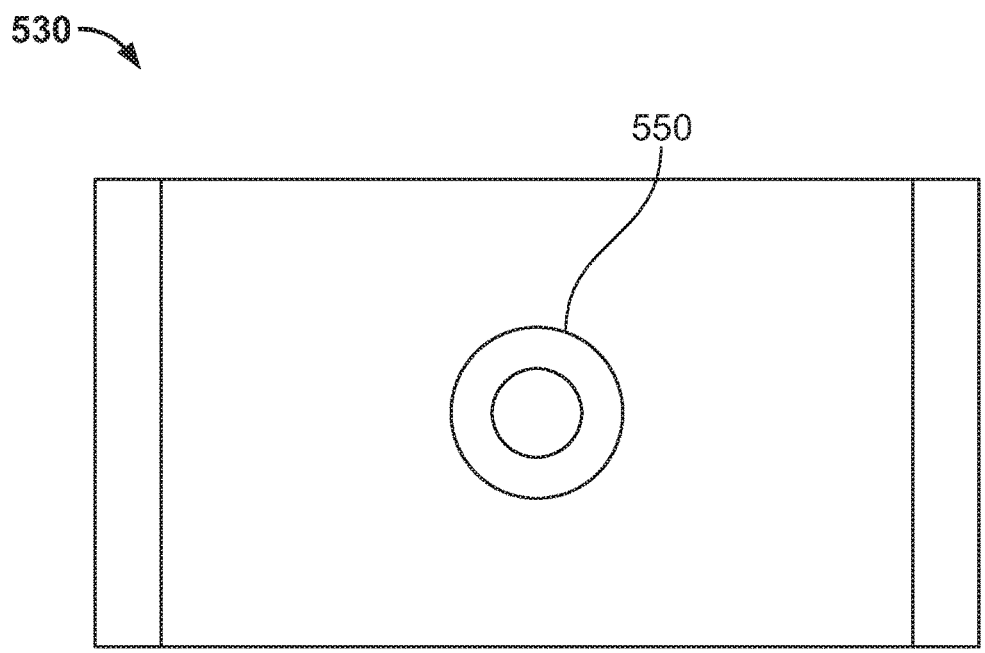
Figure 7D:
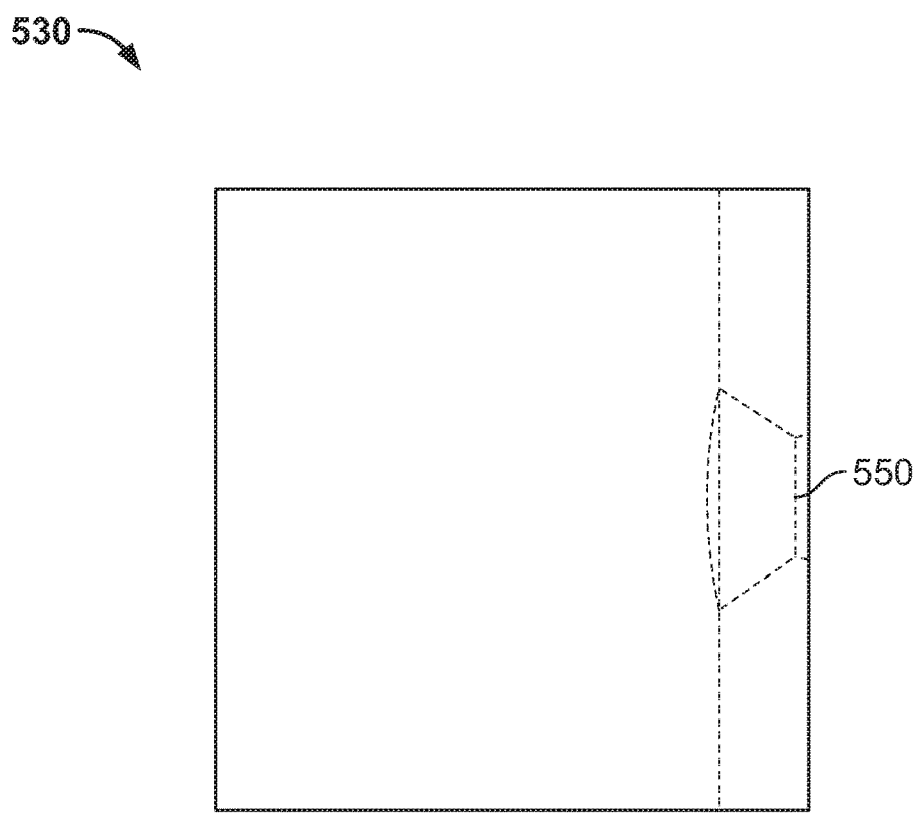

In an embodiment, the retention member 530 may further include a lock mechanism (not shown) that may be used to ensure that the retention member 530 does not pull away from the wheel chair in the event that the wheelchair begins to separate from the retention member 530 (e.g., while going over a curb). In another embodiment, no lock mechanism may be used to avoid the wheelchair being held together with the cart for safety purposes. FIG. 7B shows a top front right perspective view of the retention member 530 of FIG. 7A. FIG. 7C shows a front view of the retention member 530 of FIG. 7A. FIG. 7D shows a side view of the retention member 530 of FIG. 7A.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities, length, width, other properties, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth herein are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Having described the present disclosure in detail, it will be apparent that modifications, variations, and equivalent embodiments are possible without departing the scope of the present disclosure defined in the appended claims.

As various modifications could be made in the compositions and methods herein described without departing from the scope of the invention, it is intended that all matter contained in the foregoing description shall be interpreted as illustrative rather than limiting. The breadth and scope of the present invention should not be limited by any of the above-described exemplary embodiments, but should be defined only in accordance with the following claims appended hereto and their equivalents. All patent and non-patent documents cited in this specification are incorporated herein by reference in their entireties.

What is claimed:

1. A cart that is releasably attachable with a wheelchair, the cart comprising:
    a frame;
    a basket connected to said frame;
    a plurality of wheels configured to support said frame;
    a pair of wheelchair connector arms connected to the frame, and including:
        a bracket connected to said frame;
        a guidepost extending from said bracket;
        a compression spring coaxially disposed on said guidepost;
        a sleeve disposed between the guidepost and the compression spring; and
        an arm having a first end and a second end, the first end of said arm slidably supported by said guidepost, said compression spring being configured to apply a force to said bracket and said arm, said arm being releasably attachable with the wheelchair.

2. The cart according to claim 1, further comprising a retention member attached to the second end of said arm, said retention member being releasably attachable to a portion of the wheelchair.

3. The cart according to claim 1, wherein the frame includes a lower frame portion and an upper frame portion.

4. The cart according to claim 3, wherein the lower frame portion includes a front frame member and a pair of side frame members, the pair of side frame members forming an angle of greater than 90° relative to the front frame member.

5. The cart according to claim 4, wherein angle is about 125° angle.

6. The cart according to claim 3, wherein the lower frame portion and the upper frame portion are separated by about 29 inches.

7. The cart according to claim 1, wherein said compression spring has a deflection load between about 5 pounds and about 50 pounds.

8. The cart according to claim 1, wherein the compression spring has a deflection load of about 20 pounds.

9. The cart according to claim 1, further comprising a retention member having a portion that is semi-circular.

10. The cart according to claim 9, wherein the semi-circular portion of the retention member is a "C" shape.

11. The cart according to claim 1, wherein the basket includes a shelf attached to an inside surface of the basket.

12. The cart according to claim 1, wherein the bracket is an L-shaped bracket having a first end and a second end, the first end being attached to the frame.

13. The cart according to claim 12, wherein the frame having an upper portion, the first end of the L-shaped bracket is attached to the upper portion of the frame.

14. The cart according to claim 1, wherein said basket includes a front wall closest to a wheelchair when engaged, a left side wall, a right side wall, and a rear wall farthest from the wheelchair when engaged.

15. The cart according to claim 14, wherein at least a portion of the front wall is shorter than an uppermost portion of the rear wall.

16. The cart according to claim 15, wherein the right and left side walls have a ramped height between the front wall and the rear wall, such that the height of the right and left side walls nearest the front wall is lower than the height of the right and left side walls nearest the rear wall.

17. The cart according to claim 1, wherein the arm is rotatably supported by the guidepost.

\* \* \* \* \*